(12) United States Patent
Dimnaku et al.

(10) Patent No.: US 12,135,877 B2
(45) Date of Patent: Nov. 5, 2024

(54) WORKLOAD ANALYSIS FOR LONG-TERM MANAGEMENT VIA PERFORMANCE SERVICE LEVELS

(71) Applicant: NetApp, Inc., Sunnyvale, CA (US)

(72) Inventors: Alma Dimnaku, Wellesley, MA (US); Abhishek Hiregoudar, Arlington, MA (US); Siu Wu, Canton, MA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/241,887

(22) Filed: Apr. 27, 2021

(65) Prior Publication Data

US 2022/0342556 A1    Oct. 27, 2022

(51) Int. Cl.
*G06F 3/06*  (2006.01)
*G06F 11/34*  (2006.01)

(52) U.S. Cl.
CPC .......... *G06F 3/0611* (2013.01); *G06F 3/0635* (2013.01); *G06F 3/0659* (2013.01); *G06F 3/067* (2013.01); *G06F 11/3433* (2013.01)

(58) Field of Classification Search
CPC .... G06F 3/0611; G06F 3/0635; G06F 3/0659; G06F 3/067
See application file for complete search history.

(56) References Cited

U.S. PATENT DOCUMENTS

| | | | |
|---|---|---|---|
| 2004/0123030 A1* | 6/2004 | Dalal | G06F 3/0605 711/170 |
| 2004/0193397 A1* | 9/2004 | Lumb | G06F 13/105 703/24 |
| 2005/0154576 A1* | 7/2005 | Tarui | H04L 41/145 703/22 |
| 2006/0161753 A1* | 7/2006 | Aschoff | G06F 3/067 711/170 |

(Continued)

OTHER PUBLICATIONS

Performance Monitoring. In: Pro Oracle Database 10g RAC on Linux. Apress. https://doi.org/10.1007/978-1-4302-0214-1_24 (Year: 2006).*

(Continued)

*Primary Examiner* — Kalpit Parikh
(74) *Attorney, Agent, or Firm* — HAYNES AND BOONE, LLP

(57) ABSTRACT

Systems, methods, and machine-readable media for monitoring a storage system and assigning performance service levels to workloads running on nodes within a cluster are disclosed. A performance manager may estimate the performance demands of each workload within the cluster and assign a performance service level to each workload according to the performance requirements of the workload, and further taking into account an overall budgeting framework. The estimates are performed using historical performance data for each workload. A performance service level may include a service level object, a service level agreement, and latency parameters. These parameters may provide a ceiling (Continued)

to the number of operations per second that a workload may use without guaranteeing the use of the operations per second, a guaranteed number of operations per second that a workload may use before being throttled, and define the permitted delay in completing a request to the workload.

21 Claims, 7 Drawing Sheets

(56) References Cited

U.S. PATENT DOCUMENTS

| | | | | |
|---|---|---|---|---|
| 2013/0227111 | A1* | 8/2013 | Wright | G06F 9/5083 |
| | | | | 709/223 |
| 2015/0199388 | A1* | 7/2015 | Hrischuk | G06F 3/0635 |
| | | | | 707/802 |
| 2015/0227397 | A1* | 8/2015 | Gogula | G06F 9/5094 |
| | | | | 718/104 |
| 2016/0359683 | A1* | 12/2016 | Bartfai-Walcott | H04L 41/149 |
| 2017/0168729 | A1* | 6/2017 | Faulkner | G06F 3/0631 |
| 2017/0302738 | A1* | 10/2017 | Dimnaku | G06F 3/061 |
| 2017/0373960 | A1* | 12/2017 | Sachdev | H04L 43/08 |
| 2019/0163586 | A1* | 5/2019 | McBride | G06F 11/0712 |

OTHER PUBLICATIONS

Oracle (Year: 2006).*

* cited by examiner

WORKLOAD ANALYSIS FOR LONG-TERM MANAGEMENT VIA PERFORMANCE SERVICE LEVELS

TECHNICAL FIELD

The present description relates to managing performance of data storage. More specifically, the present description relates to assigning/providing differentiated services to workloads associated with data storage over the lifecycle of the data storage, such as in a data cluster on premises or in the cloud.

BACKGROUND

A storage system typically includes at least a computing system executing a storage operating system for storing and retrieving data on behalf of one or more client computing systems. To process an input/output (I/O) request to read and/or write data, various resources are typically used within a storage system. As storage systems continue to expand in size, complexity and operating speeds, it is desirable to efficiently monitor and manage resource usage.

Continuous efforts are being made to better manage and monitor workloads within networked storage environments. For example, enterprise systems may attempt to prioritize user workloads so that low priority workloads do not overtake the resources of the infrastructure and cause performance loss. Systems may do so via service level agreements and/or service level objectives which are applied and assigned to workloads at an appropriate level. This is often done manually.

However, with the increasing size of deployments, the complexity of assigning the right service levels to best match the overall profile of a given workload, while also taking into account any higher level system goals of the cluster, is becoming prohibitively difficult. As a result, there is a need to manage performance of workloads via the assignment and implementation of service levels.

BRIEF DESCRIPTION OF THE DRAWINGS

The present disclosure is best understood from the following detailed description when read with the accompanying figures.

DETAILED DESCRIPTION

Figure 1:
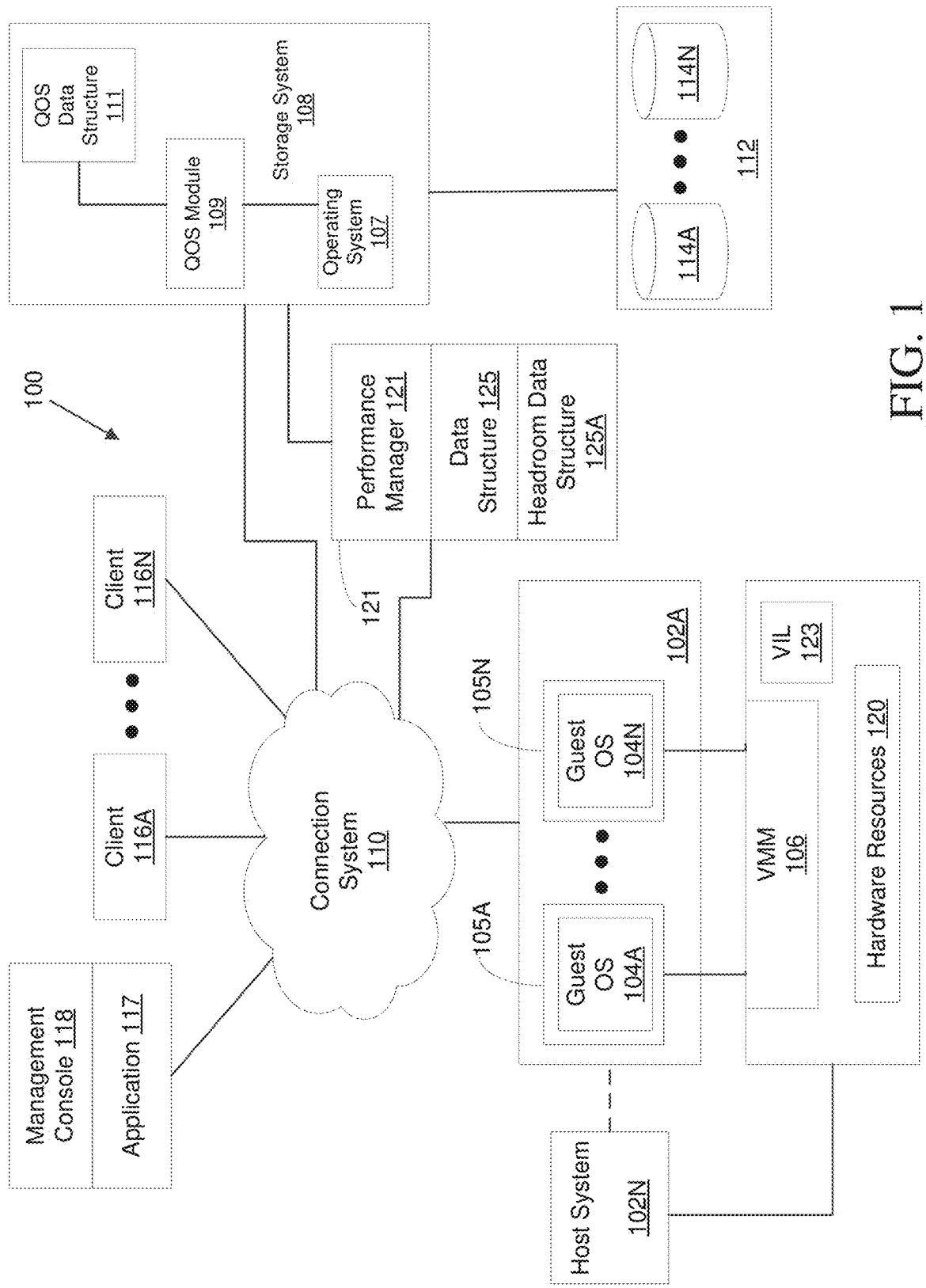
FIG. 1 illustrates an example of an operating environment used by one or more embodiments.

Various embodiments include systems, methods, and machine-readable media for assigning and/or providing differentiated services to workloads associated with data storage over the lifecycle of the data storage, such as in a data cluster on premises or in the cloud. In an embodiment, a storage system may contain one or more resources, or nodes. Each node may host one or more workloads, or logical unit numbers (LUN), provisioned through a user interface. Each workload, or LUN, in the storage system may have performance demands and requirements. The performance demands may be measured as storage capacity, input/output operations per second (IOPS), and latency. User demand of each workload may increase and decrease over a period time. The period of time may be measured in seconds, minutes, hours, days, and/or months (to name a few examples).

The performance demands of the workloads may be controlled by assigning a performance service level (PSL) to each workload in the storage system (with each PSL including one or more parameters as discussed further below). Different PSLs may be used to provide differentiated services to workloads. A PSL may be assigned to a workload to allow a storage system to manage the workload throughout the lifetime of the workload. Each PSL may be used to define access control and prioritization of a workload through quality of service (QOS) policies (e.g., one or more policies). A QOS policy may limit the performance of a workload. Properly managing the workload PSL ensures consistent performance across the storage system and improves the efficiency of the storage system.

A PSL may be used to provide differentiated services to workloads. There may be multiple ways in which to control the service received by a workload, including access control and prioritization. For example, a PSL may define a service level objective (SLO) (e.g., access control), a service level agreement (SLA) (e.g., prioritization), and/or a latency. The SLO may provide a target of peak IOPS, or ceiling, to be served to the workload by a QOS policy. The SLA may provide a guaranteed number of IOPS to be served to the workload by a QOS policy. Latency may refer to a delay in completing the processing of an I/O request and may be measured using different metrics for example, a response time in processing I/O requests. A PSL associated with each workload may have different values for the SLO, SLA, and/or latency from each other.

In some embodiments, a performance manager (e.g., a software and/or hardware component within the storage system or associated with the storage system) may automate the monitoring and management of the various resources and workloads within a cluster-based storage system across the lifetime of the storage system by way of assigning and/or managing PSLs.

For example, a performance manager may monitor the workloads of the various nodes, or resources, and assign a PSL to each workload to ensure that there are sufficient computing resources to handle all IOPS directed to each workload. Monitoring of the workloads may include measuring workload performance and estimating future workload performance based on the measured performance. The performance manager may interface with a storage operating system to collect the performance data for the different workloads. Performance data may provide a certain throughput (e.g., amount of data that is transferred within a given time interval (e.g., megabytes per seconds (MBS)), latency and/or a number of I/O operations that can be processed within a time interval, for example, in a second (referred to as IOPS).

In some embodiments, the performance manager may budget, or allocate, the IOPS available within the storage system to the various workloads running on the various resources. The performance manger may budget the available IOPS by assigning a PSL to each workload. Budgeting the IOPS and assigning PSLs to workloads accordingly ensures that the resources hosting the workloads are not overloaded. In some examples, the performance manager may overprovision, or over budget, the available IOPS to better utilize each resource by some factor which may vary between expected IOPS and peak IOPS.

For example, the performance manager may overbudget the expected IOPS by a factor of four and overbudget the peak IOPS by a factor of ten. As an example, if a resource has 100 K IOPS available then the performance manager may budget, or allocate, 400 K expected IOPS and 1M peak IOPS. This approach may avoid overloading the resources of the storage system because the IOPS for each workload at a point in time may increase and decrease at different rates over time. Furthermore, a workload may be generally provisioned with a buffer between the normal, or average, IOPS used and the expected IOPS used. This buffer may be larger between the average IOPS used and the peak IOPS used. Therefore, by overprovisioning the resources, the storage system may utilize more of the storage resources while providing the IOPS guaranteed by the SLA and even providing some of the target IOPS available under the SLO (e.g., as provided by the PSL having the SLA and SLO).

It is understood that the above is just an example. Furthermore, the above example is not necessarily an aggressive example of overbudgeting because it is budgeting IOPS based for the SLAs based on the allocated storage capacity of each workload when the workloads may not reach that capacity during their lifetime. Further, the above example is not necessarily a conservative example of overbudgeting because the SLOs are estimated based on the peak IOPS for each workload based on the used storage capacity.

In some embodiments, the performance manager may estimate the performance demand of each workload. The performance demand estimates may be based on historical performance data collected for each workload. These estimates may allow the performance manager to make better informed decisions about the performance demands of the various workloads than otherwise available without the estimates, in order to avoid having to constantly re-assign PSLs to the workloads in the storage system.

The performance manager may update the assigned PSLs (e.g., periodically, on a set schedule, or after a triggering event). For example, the performance manager may estimate the performance demand of each workload using the most recent performance data and decide whether the currently assigned PSL is still compatible with the performance of the workload. For example, the performance manager may determine that the currently assigned PSL no longer provides the guaranteed IOPS, or SLA, required by the workload. In this case performance manager may assign a different PSL to the workload. This may be accomplished automatically by the performance manager, or by recommendation for user authorization. The performance manager may move the workload from a node that does not support the updated PSL to a node that supports the updated PSL. The assigning of different PSLs and/or moving workload may be done within the overall budget/overbudgeting of available IOPS.

In some embodiments, the performance manager may monitor the PSL settings to determine whether any changes have been made the setting of PSL. If the performance determines that the settings of a PSL have been changed, the performance manager may need to verify that the PSL still provides the service required to each workload that is assigned the affected PSL.

As a result, embodiments of this system enable a storage system to monitor and manage resource workloads that may be too complex for manual monitoring/decision making. The performance manager may estimate the performance demands of each workload based on historical data and assign an appropriate PSL. The actions taken by the performance manager may more accurately account for the performance demands of the workloads in the storage system allowing for greater overall utilization of the resources. This is caused by more efficient use of the resources. Moreover, the actions taken by the performance manager may reduce disruptions to resources and workloads in the system by workload demands exceeding available resources. This provides, overall, a framework to enable users to ensure consistent performance throughout the lifetime of a storage system (e.g., a cluster) despite the stage in operation of the system. By assigning PSLs to workloads, the performance of all workloads served by the resource(s) may be optimized as well.

FIG. 1 illustrates a system architecture 100 where one or more embodiments may be implemented. The architecture 100 may include a performance manager 121 that interfaces with a storage operating system 107 of a storage system 108 for receiving performance data and performing actions related to workload management as described further herein. The performance manager 121 may be a processor executable module that is executed by one or more processors out of a memory device.

The performance manager 121 may obtain the performance data and store it at a data structure 125. In some embodiments, performance manager 121 may analyze the performance data for determining headroom, or available performance capacity, for a given resource. The performance manager 121 may further analyze the data for determining PSLs, adjustments to PSLs, etc. as is discussed further below. Headroom related information may be stored at data structure 125A. Details regarding the various operations performed by the performance manager 121 for determining headroom are provided below.

In some embodiments, storage system 108 may have access to a set of mass storage devices 114A-114N (which may be referred to as storage devices 114 or simply as storage device 114) within at least one storage subsystem 112. The storage devices 114 may include writable storage device media such as magnetic disks (HDD), video tape, optical, digital video disk (DVD), magnetic tape, non-volatile memory devices for example, solid state drives (SSDs) including self-encrypting drives, flash memory devices, and any other similar media adapted to store information. The storage devices 114 may be organized as one or more groups of Redundant Array of Independent (or Inexpensive) Disks (RAID) or other type of redundancy. The embodiments disclosed are not limited to any particular storage device type or storage device configuration.

In some embodiments, the storage system 108 may provide a set of logical storage volumes (which may be interchangeably referred to as volume or storage volume herein) for providing physical storage space to clients 116A-116N (or virtual machines (VMs) 105A-105N). A storage volume may be a logical storage object and may typically include a file system in a NAS environment or a logical unit number (LUN) in a SAN environment. The various embodiments described herein are not limited to any specific format in which physical storage is presented as logical storage (volume, LUNs, and others).

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at least one storage device, an aggregate of some or all of the storage space in multiple storage devices, a RAID group, or any other suitable set of storage space.

A storage volume may be identified by a unique identifier (e.g., a Volume-ID) and be allocated certain storage space during a configuration, or provisioning, process. When the storage volume is created, a QOS policy may be associated with the storage volume such that requests associated with the storage volume can be managed appropriately. The QOS policy may be a part of a QOS policy group that is used to manage QOS for several different storage volumes as a single unit. The QOS policy information may be stored at a QOS data structure 111 maintained by a QOS module 109. QOS at the storage system level may be implemented by the QOS module 109. The QOS module 109 may maintain various QOS data types that are monitored and analyzed by the performance manager 121, as described below in detail.

The storage operating system 107 may organize physical storage space at storage devices 114 as one or more "aggregates," where each aggregate may be a logical grouping of physical storage identified by a unique identifier and a location. An aggregate may include a certain amount of storage space that can be expanded. Within each aggregate, one or more storage volumes may be created whose size can be varied. A qtree, sub-volume unit may also be created within the storage volumes. For QOS management, each aggregate and the storage devices within the aggregates may be considered as resources that are used by storage volumes.

The storage system 108 may be used to store and manage information at storage devices 114 based on an I/O request. The request may be based on file-based access protocols, such as the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP). As yet other examples, the request may use one or more other cloud-related protocols.

In a typical mode of operation, a client (or a VM) may transmit one or more I/O requests, such as a CFS or NFS read or write request, over a connection system 110 (e.g., a network 110) to the storage system 108. The storage operating system 107 may receive the request, issue one or more I/O commands to storage devices 114 to read or write the data on behalf of the client system, and issue a CIFS or NFS response containing the requested data over the network 110 to the respective client system. The network 110 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 110 may use TCP/IP, a remote direct memory access (RDMA) protocol (e.g., Infiniband®, RDMA over Converged Ethernet (RoCE) protocol (e.g., RoCEv1, RoCEv2), iWARP), and/or another type of protocol. Network 110 may be local or remote with respect to a rack or datacenter.

Additionally, or in the alternative, the network 110 may extend between sites in a WAN configuration or be a virtual network extending throughout a cloud. Thus, storage nodes of the storage system 108 may be as physically close or widely dispersed as needed depending on the application of use. In some examples, the storage nodes are housed in the same racks. In other examples, the storage nodes are located in different facilities at different sites around the world. The distribution and arrangement of the storage nodes may be determined based on cost, fault tolerance, network infrastructure, geography of the server nodes, another consideration, or a combination thereof.

The architecture 100 may also include a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources." More generally, the architecture 100 may provide infrastructure including any set of resources used for executing one or more containers, virtual machines, or other hosted virtualization tool.

The guest software expects to operate as if it were running on a dedicated computer rather than in a VM. That is, the guest software expects to control various events and have access to hardware resources on a physical computing system (may also be referred to as a host platform or host system) which may be referred to herein as "host hardware resources." The host hardware resources may include one or more processors, resources resident on the processors (e.g., control registers, caches and others), memory (instructions residing in memory, e.g., descriptor tables), and other resources (e.g., input/output devices, host attached storage, network attached storage or other like storage), communication capacity resources, etc., that reside in a physical machine or are coupled to the host system. These may be resources that a virtualization tool may use for execution of one or more workloads for clients, including any combination of on-premises, distributed, and/or cloud resources.

In some embodiments, the architecture 100 may also include a plurality of computing systems 102A-102N (which may also be referred to individually as host platform/system 102 or simply as server 102) communicably coupled to the storage system 108 via the connection system 110. As described herein, the term "communicably coupled" may refer to a direct connection, a network connection, a wireless connection, or other connections to enable communication between devices.

The host system 102A may include a processor executable virtual machine environment having a plurality of VMs 105A-105N that may be presented to client computing devices/systems 116A-116N. The VMs 105A-105N may execute a plurality of guest OS 104A-104N (which may also be referred to as guest OS 104) that share hardware resources 120. As described above, hardware resources 120 may include processors, memory, I/O devices, storage or any other hardware resource. Moreover, as also noted above, the VMs 105A-105N may instead be containers or other hosted virtualization tool.

In some embodiments, the host system 102 may interface with a virtual machine monitor (VMM) 106, for example, a processor executed Hyper-V layer provided by Microsoft Corporation of Redmond, Wash., a hypervisor layer provided by VMWare Inc., or any other type. The VMM 106 may present and manage the plurality of guest OS 104A-104N executed by the host system 102. The VMM 106 may include or interface with a virtualization layer (VIL) 123 that provides one or more virtualized hardware resource to each OS 104A-104N. As another example, the host system 102 may interface with one or more monitors associated with container resources, such as part of an orchestration platform, or other monitoring tool associated with a hosted virtualization tool. Embodiments will be discussed herein with reference to VMM 106 for simplicity of discussion.

In some embodiments, the VMM 106 may be executed by the host system 102A with VMs 105A-105N. In other embodiments, the VMM 106 may be executed by an independent stand-alone computing system, often referred to as a hypervisor server or VMM server and the VMs 105A-105N are presented at one or more computing systems.

Different vendors may provide different virtualization environments, for example, VMware Corporation, Microsoft Corporation and others. The generic virtualization environment described above with respect to FIG. 1 may be customized to implement embodiments described herein. Furthermore, the VMM 106 (or the VIL 123) may execute other modules, for example, a storage driver, network interface and others, the details of which are not germane to the embodiments described herein and hence have not been described in detail.

The architecture 100 may also include a management console 118 that may execute a processor executable management application 117 for managing and configuring various elements of the architecture 100. The application 117 may be used to manage and configure VMs and clients as well as configure resources that are used by VMs/clients, according to some embodiments. While one management console 118 is shown in FIG. 1, the architecture 100 may include other management consoles performing certain functions, for example, managing storage systems, managing network connections and other functions described below.

In some embodiments, the application 117 may be used to present storage space that is managed by the storage system 108 to clients 116A-116N (or VMs, containers, etc.). The clients may be grouped into different service levels (also referred to as performance service levels, PSLs, herein, which may include SLAs, SLOs, etc., which may be managed and updated as described further herein that would best fit the profile of their demands to support decision-making in choosing a PSL that is supported by data analytics for an overall simpler management of workloads and their needs). In accordance with some embodiments, a client with a higher service level may be provided with more storage space than a client with a lower service level. A client at a higher level may also be provided with a certain QOS vis-à-vis a client at a lower level (e.g., a higher QOS for the client at the higher level than a QOS provided to the client at the lower level). While PSLs may be client based, in some embodiments PSLs may be managed per workload.

Recommending and/or updating PSLs per workload may enable a simpler onboarding process (e.g., by assigning PSLs to workloads already existing in the clusters under management). Similarly, if the workload is provisioned outside of management, the workload may still be onboarded by recommending the best PSL fit as discussed further herein.

The workloads under management may be monitored continuously, or periodically, and evaluated periodically to identify the PSL best fitting the profile of the workloads' respective demands. The monitoring may also include proposing new PSLs if the customer (e.g., of the system, and/or source of the workload) has not defined any, or the PSLs defined already, to fit the demand of the workloads in the clustered storage system. This may be accomplished using one or more techniques that cluster the workloads based on one or more of their attributes such as inferred business criticality (e.g., via keywords in their names), placement of the workloads, and/or IOPS throughput analysis over time. The recommendation of the best PSL fit may be driven by the definition of the PSLs themselves, the current approach in allocating (e.g., budgeting) IOPS, and/or an expectation that the PSL for a workload does not change very often (rather, a handful of times over the lifetime of the workload for example). Further details are discussed below with respect to the examples of the remaining figures.

Figure 2:
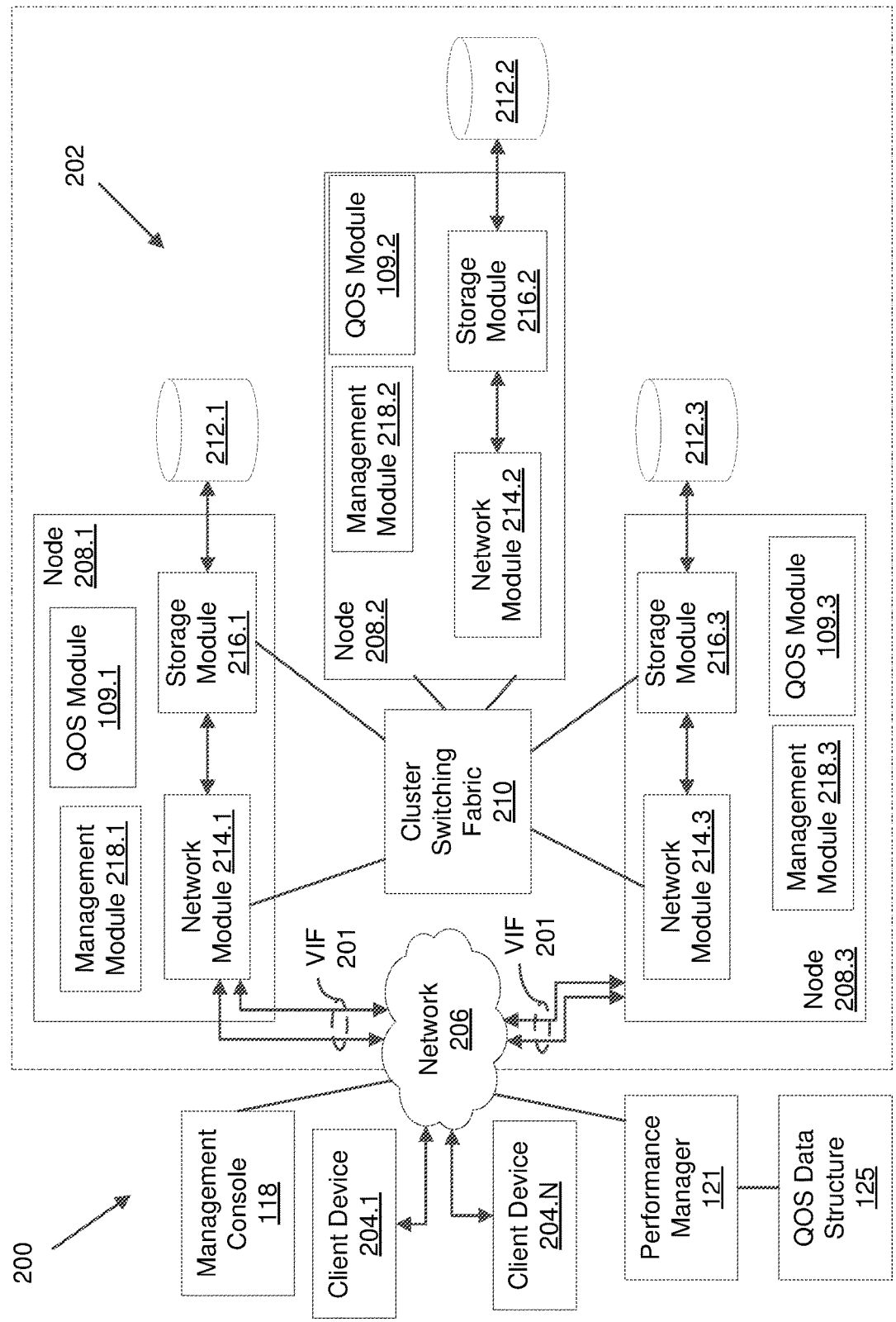
FIG. 2 illustrates an example of a clustered storage system, used according to one or more embodiments.

The storage system 108 may be a stand-alone system, i.e., a non-cluster based system, while in other embodiments, the storage system 108 may have a distributed architecture (and/or cloud-based architecture). For example, FIG. 2 illustrates a cluster-based system.

According to some embodiments, the storage environment 200 has a plurality of nodes for managing storage devices. The storage environment 200 may include a plurality of client systems 204.1-204.N (similar to clients 116A-116N, FIG. 1), a clustered storage system 202, performance manager 121, management console 118, and at least a network 206 (examples of which were given above with respect to network 110 of FIG. 1) communicably connecting the client systems 204.1-204.N and the clustered storage system 202.

The clustered storage system 202 may include a plurality of nodes 208.1-208.3, a cluster switching fabric 210, and a plurality of mass storage devices 212.1-212.3 (which may be referred to as storage device 212 and similar to storage device 114) used as resources for processing I/O requests.

Each of the plurality of nodes 208.1-208.3 may be configured to include a network module (which may be referred to as N-module), a storage module (which may be referred to as D-module), and a management module (which may be referred to as M-Module), each of which can be implemented as a processor executable module. Specifically, node 208.1 may include a network module 214.1, a storage module 216.1, and a management module 218.1; node 208.2 may include a network module 214.2, a storage module 216.2, and a management module 218.2; and node 208.3 may include a network module 214.3, a storage module 216.3, and a management module 218.3.

The network modules 214.1-214.3 may include functionality that enable the respective nodes 208.1-208.3 to connect to one or more of the client systems 204.1-204.N over the network 206, while the storage modules 216.1-216.3 may connect to one or more of the storage devices 212.1-212.3. Accordingly, each of the plurality of nodes 208.1-208.3 in the clustered storage server arrangement may provide the functionality of a storage server. The management modules 218.1-218.3 may provide management functions for the clustered storage system 202. For example, the management modules 218.1-218.3 may collect storage information regarding storage devices 212.

Each node may execute or interface with a QOS module, shown as 109.1-109.3 in FIG. 2, similar to the QOS module 109. The QOS module 109 may be executed for each node or a single QOS module may be used for a subset of, or all of, the cluster. The embodiments disclosed herein are not limited to the number of instances of QOS module 109 that may be used in a cluster. In addition, a switched virtualization layer including a plurality of virtual interfaces (VIFs) 201 may be provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines (SVM)), in which each SVM represents a single storage system namespace with separate network access. Each SVM may have a client domain and a security domain that are separate from the client and security domains of other SVMs. Moreover, each SVM may be associated with one or more VIFs and can span one or more physical nodes, each of which can hold one or more VIFs and storage associated with one or more SVMs. Client systems can access the data on a SVM from any node of the clustered system, through the VIFs associated with that SVM. It is noteworthy that the embodiments described herein are not limited to the use of SVMs.

Each of the nodes 208.1-208.3 may be defined as a computing system to provide application services to one or more of the client systems 204.1-204.N. The nodes 208.1-208.3 may be interconnected by the switching fabric 210, which, for example, may be embodied as a Gigabit Ethernet switch or any other type of switching/connecting device including one or more of the examples given above with respect to network 110 in FIG. 1.

Although FIG. 2 depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, the clustered storage system 202 may include a plurality of network modules and a plurality of storage modules interconnected in a configuration that does not reflect a one-to-one correspondence between the network modules and storage modules.

Each client system 204.1-204.N may request the services of one of the respective nodes 208.1, 208.2, 208.3, and that node may return the results of the services requested by the client system by exchanging packets over the computer network 206.

According to some embodiments, the performance manager 121 may monitor the workloads of the various nodes 208.1-208.3 and volumes within the nodes (e.g., of volumes maintained on one or more of the storage modules 216.1-216.3 as volumes, aggregates, etc.). The performance manager 121 may analyze data from the various nodes 208.1-208.3 in order to determine headroom, or available performance capacity, for a given resource. This may be collected and analyzed over time by the performance manager 121. Headroom may also be referred to herein as measured used performance capacity. Headroom may be based on a relationship of an optimal point subtracted by an operational, with the result of that divided by the optimal point. Stated another way, headroom may be based on a current utilization and a current optimal point that is determined based on collected and/or observed data. The headroom may be updated based on new current utilization information of the resource of interest. Further, the headroom may use a peak value or an average value as input.

The performance manager 121 may assign, or budget, the IOPS within the storage system 200 to the different workloads to ensure proper performance of the workloads while utilizing as much of the resources of each node 208.1-208.3 as possible. The performance manager 121 may use the available headroom as part of the budgeting determination. The performance manager 121 may budget the IOPS available in the storage system 200 based primarily on the expected IOPS of the workloads. The performance manager 121 may budget the peak IOPS as a secondary target. The total available IOPS under control of the storage system 200 may be allocated via the expected IOPS to be used over the lifetime of the workload. The lifetime of the workload may be represented by the allocated storage capacity of the workload. The secondary needs of peak IOPS may be reserved based on the current storage usage of the workload.

The performance service manager 121 may budget the IOPS by assigning a performance service level (PSL) to each workload in the storage system. For example, the performance manager 121 may assign a PSL to each workload while adhering to an overall budgeting framework for the system. A PSL may define a service level objective (SLO), a service level agreement (SLA), and a latency. The SLO may be referred to as access control and the SLA may be referred to as prioritization. The SLO may define a maximum number of IOPS available to the workload while the SLA may define a guaranteed number of IOPS available to the workload. The latency may define an acceptable delay in completing the processing of an I/O request. Each node 208.1-208.3 may support one or more PSLs. Each workload assigned to a node may be assigned a PSL that is supported by the node.

The PSL access control component, or SLO, may limit the maximum number of IOPS allowed to be served to the workload by the storage system. The PSL, via a QOS policy, may set a maximum threshold of IOPS to be served to the workload. Upon reaching the maximum IOPS threshold the workload may suffer performance degradation as the IOPS may be throttled by the storage system 200. That is, the SLO, or control access, represents a peak IOPS parameter of the PSL. Alternatively, the SLO may be considered a ceiling to the performance of a workload. The SLO may be a target to be met without being guaranteed.

The PSL prioritization component, SLA, may limit the expected number of IOPS allowed to be served to the workload by the storage system 200. The QOS policy may set an expected IOPS threshold to be served to the workload. Generally, the expected IOPS, or SLA, may determine the order of service that the IOPS directed to a workload receive within the storage system. The SLA, or expected, IOPS for a single workload may be scheduled before the SLO, or peak, IOPS of any workload within the storage system. In other words, the SLA provides guaranteed performance to the workload that has priority over the non-guaranteed IOPS of another workload.

A PSL may further define a latency of the workload. The latency of a workload may be defined as the performance received by the workload as measured in milliseconds per operation (e.g., read and/or write). The PSL may provide an expected latency for the operations of the workloads. The expected latency may measure the time to complete an operation. A PSL, via a QOS policy, may prioritize the IOPS of a workload having a lower latency than a workload having a higher latency.

The performance manager 121 may overprovision the storage and the IOPS within the resources of the storage system. That is, the performance manager may budget more IOPS to the workloads than are available within the resources of the storage system. The performance manager 121 may overprovision the SLA IOPS by a factor of four and overprovision the SLO IOPS by a factor of 10. That means, that if a node 208.1 has 10 K IOPS available, the PSL performance manager 121 budgets for 40 K guaranteed IOPS and 100 K target IOPS. While it might not be possible to provide all of the budgeted IOPS at a point in time, the budgeted IOPS will be distributed among the various workloads running the nodes 208.1-208.3 (e.g., within an overall budgeting framework). The chances of all workloads operating at expected IOPS capacity, let alone peak IOPS capacity may be low. Instead, each the demand of each workload may increase and decrease over time. In other words, while one workload is busy another workload may be idle. By overprovisioning the IOPS of the nodes 208.1-208.3 in this way, the performance manager 121 more fully utilizes the performance capacity of the nodes 208.1-208.3 allowing more workloads to run on each node 208.1-208.3 without overloading the node 208.1-208.3.

Properly budgeting the IOPS within the storage system 200 may include estimating the demands of the workloads over time so that the PSLs are properly assigned (e.g., according to an overall budgeting framework). Good estimates for the demands of the workloads allows the performance manager 121 to provide steady PSL recommendations that do not change frequently. The performance manager 121 may estimate different values for the IOPS, capacity, and latency of each workload based on historical data of the workload. The performance manager 121 may estimate the average IOPS, mean IOPS, $75^{th}$ percentile IOPS, $95^{th}$ percentile IOPS, and maximum IOPS of the over the lifetime of the workload based on its capacity (to name a few examples, including examples of percentiles used). The performance manager 121 may estimate similar values for the capacity and latency.

The estimates may be based on storage capacity, IOPS, and latency data recorded over a period of time. Generally, the estimate may be most accurate when using approximately 30 days of historical data. However, shorter and longer periods of times may be useful and/or accurate. For example, estimates may be provided with as little as 3 hours of historical data, such as with new workloads. Furthermore, estimates may be provided using 90 days of history to account for quarterly variations within the workload.

The historical data may be an averaged snapshot over a period of time. For example, the data may be averaged over 5 minutes. This averaging time period is tradeoff between gathering accurate data and using time on the resources that would otherwise be used by the workloads. The estimates may be enhanced by accounting for trends within the historical data. The estimates may be further enhanced by the modeling the periodicity of the historical data to eliminate skewed data due to idle periods of the workload.

The performance manager 121 may identify one or more PSLs based on the calculated estimates. The performance manager 121 may then suggest and/or assign one of the identified PSLs for the workload. The performance manager 121 my periodically evaluate whether the PSL assigned to each workload is still compatible with the performance demand of each workload. Additionally, the performance manager 121 may monitor each PSL for changes to the settings and evaluate whether a modified PSL is still compatible with the performance demand of each workload.

The performance manager 121 may move a workload from a current node (e.g., node 208.1) to a new node (e.g., node 208.2) in response to a change (modification) in the PSL assigned to the workload. The current node may support one or more PSLs and the newly assigned and/or changed PSL may not be one of the supported PSLs (e.g., without performance degradation/loss) while the new node may support the newly assigned PSL. For example, a workload may be initially placed on a node, such as one having magnetic hard drives, and be assigned a PSL that is supported by the node. The performance manager 121 may then assign a new PSL to the workload in response to the growth of the workload. However, the node may not support the newly assigned PSL and performance of the workload may suffer on the current node. The performance manager 121 may move (or recommend moving, and implement the move in response to an instruction) the workload to a new node that supports the newly assigned (or changed) PSL. If another node that better supports the modified PSL is not available, then the workload may remain at the current node.

Figure 3:
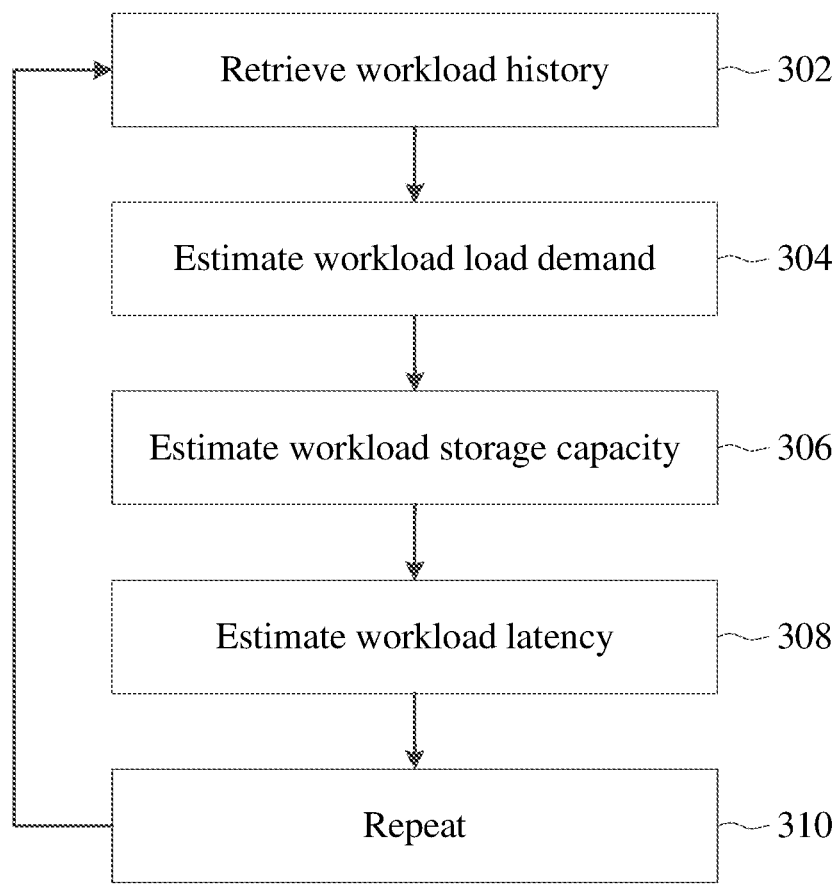
FIG. 3 illustrates a flow diagram of an exemplary method for estimating workload performance demand according to one or more embodiments.

Turning to FIG. 3, a flow diagram of an exemplary method 300 is illustrated according to one or more embodiments. In particular, the method 300 provides for estimating workload use requirements within a storage system such as architecture 100 or storage system 200. The work in method 300 may be performed by a management module that analyzes workloads (e.g., volumes or LUNs) in a storage system to estimate various usage values for IOPS, capacity, and latency. In some embodiments, the performance manager 121 may perform the management tasks. In some embodiments, the management module 218 may perform the management tasks. Although any suitable module may perform the analysis task, the performance manager 121 will be referred to below for simplicity. As illustrated, the method 300 includes a number of enumerated steps, but embodiments of the method 300 may include additional steps before, after, and in between the enumerated steps. In some embodiments, one or more of the enumerated steps may be omitted, performed in parallel, or performed in a different order.

At block 302, the performance manager 121 retrieves the workload historical performance data, or historical data. In some embodiments, the workload historical data may be stored in the storage system. In some embodiments, the workload historical data may be imported from a previous host of the workload. The historical data may include 30 days of workload performance data (as one example). In some examples, the workload historical data used to perform the estimates may include 90 days of performance data (as another example). In some examples, the workload may be new and there may just a few hours of workload historical data. As discussed above, the estimate values may be enhanced through the use of trending and modeling of periodicity of the performance data. This information may provide a better estimate of the performance demand by eliminating skewness caused by partially idle workloads.

The workload historical data may include performance data averaged over an interval of time (e.g., on the order of 5 minutes). In some embodiments, the performance data may be averaged over a shorter or longer interval of time. While a shorter interval provides more accurate data more computational resources are required to collect the data. A longer interval uses fewer computational resources but provides less accurate performance data. With a small number of PSLs, the accuracy of the historical data averaged over time intervals may be sufficient. However, as the number of PSLs grow, the time period over which the performance data is averaged may need to decrease to better differentiate between the different PSLs.

At block 304, the performance manager 121 estimates the workload demand. The workload demand may be measured in input/output operations per second (IOPS). In some embodiments, the workload demand may be measured in Mega-bits per second (MBPs). In some embodiments, both measurements may be used. The workload performance estimates may include multiple different IOPS values. For example, the performance manager 121 may estimate the average IOPS over a period of time, the median IOPS over the period of time, and the max IOPS over the period of time. The estimates may further include the $95^{th}$ percentile IOPS and the $75^{th}$ percentile IOPS. It is contemplated that other values may be used as needed to better estimate the actual use of a workload.

At block 306, the performance manager 121 estimates the storage capacity of the workload. For example, the performance manager 121 may estimate the maximum used storage capacity, the average used capacity, and the mean used storage capacity. The estimates may further include the $95^{th}$ percentile used storage capacity and the $75^{th}$ percentile used storage capacity. Other intervals are contemplated as data points for used storage capacity and may be able to better represent the workload.

At block 308, the performance manager 121 estimates the latency of the workload (e.g., according to current hardware and/or software configuration(s) of the storage system 200). Latency may be measured as the time required to process a storage transaction, operation, or data request. For example, the latency may refer to the time required to complete a read or write request. The performance manager may estimate the expected latency based on the historical data. The estimates may include the average latency, the mean latency, and the maximum latency. The estimates may further include the $95^{th}$ percentile latency and the $75^{th}$ percentile latency. Other latency values are contemplated and may be used to provide a better representation of the workload performance.

At block 310, the performance manager 121 repeats the performance estimate of each workload. In some embodiments, the estimates may be recalculated every 24 hours using current performance data to provide an up-to-date estimate. In some embodiments, the estimate may be repeated at a scheduled time every 24 hours. In some embodiments, the estimate may be repeated 24 hours after the previous estimate finished. In some examples, the interval between estimates is larger or smaller. In yet further embodiments, the interval may dynamically change in response to a trigger, such as a change in system configuration (e.g., addition or removal of hardware to a node/cluster/etc.), or due to a metric passing a threshold (such as actual demand on storage capacity, performance, and/or latency either at a point in time or over time). The difference in intervals may allow for managing the computational resources required to perform the estimations.

Figure 4:
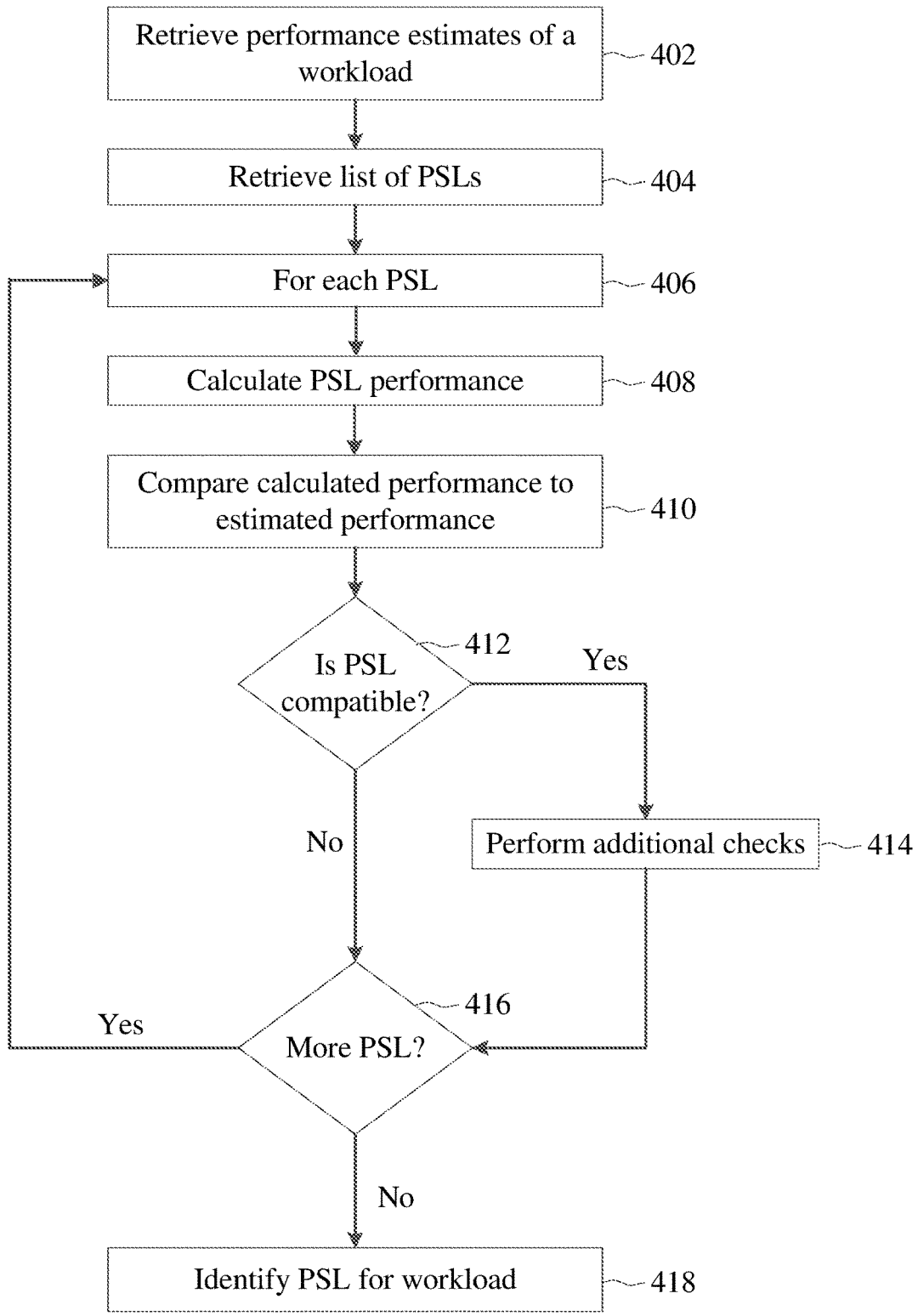
FIG. 4 illustrates a flow diagram of an exemplary method for identifying a compatible performance service level for a workload according to one or more embodiments.

Turning to FIG. 4, a flow diagram of an exemplary method 400 is illustrated according to one or more embodiments. In particular, the method 400 provides for identifying a suitable performance service level (PSL) for a given workload within a storage system such as architecture 100 or storage system 200. The work in method 400 may be performed by a management module that analyzes workloads (e.g., volumes or LUNs) in a storage system to determine the PSL based on estimates of various usage values for load, capacity, and latency. In some embodiments, the performance manager 121 may perform the management tasks. In some embodiments, the management module 218 may perform the management tasks. Although any suitable module may perform the analysis task, the performance manager 121 will be referred to below for simplicity. The specific data and calculations used to identify a suitable PSL may modified to fit the needs of the applications. As such, the discussion below is for illustrative purposes and is not limiting. As such, it is understood that while examples of possible combinations of data and calculations are described below, other combinations and uses are contemplated and within the scope of this disclosure. As illustrated, the method 400 includes a number of enumerated steps, but aspects of the method 400 may include additional steps before, after, and in between the enumerated steps. In some embodiments, one or more of the enumerated steps may be omitted, performed in parallel, or performed in a different order.

At block 402, the performance manager 121 retrieves performance estimates for a workload. In some examples, the performance estimates may be received directly as output of the method 300. In some examples, the performance use data may be retrieved from a data store, such as for example, a file system or a database. In some embodiments, the estimates include a timestamp to ensure that the information is recent enough to be accurate. In some embodiments, the performance manager 121 may request all of the estimate data. In some embodiments, the performance manager 121 may request a subset of the estimate data. For example, the method 400 may use the $75^{th}$ percentile value for the load, the maximum value for the load, and the $75^{th}$ percentile value for used storage capacity. In some examples, different estimated values may be used. In some examples, all estimated performance data may be requested and used.

At block 404, the performance manager 121 retrieves a list of available PSLs. In some examples, there may be a list of pre-defined PSLs available for use. In some examples, the number of PSLs may be limited by the current customer plan. In some examples, there may be a list of custom PSLs that may be used. In further examples, a combination of the above may be present the in the list of available PSLs.

At block 406, the performance manager 121 selects a PSL from the list of PSLs. The PSL selected from the list may be selected according to an overall budgeting framework (or, alternatively or additionally, the overall budgeting framework may be considered when identifying a PSL, such as at block 418 below). The method 400 may iterate over the list of PSLs by selecting one PSL and performing the following tasks using that PSL. The method 400 may then return to select a different PSL to perform the tasks until all PSLs have been processed.

At block 408, the performance manager 121 calculates the performance of the PSL selected at block 406 for the given workload. In an embodiment, the performance manager 121 may calculate the peak IOPS that would be allocated by the selected PSL to the workload given the used capacity estimate. The performance manager 121 may further calculate the expected IOPS that would be allocated by the selected PSL to the workload given the storage capacity allocated to the workload.

In another embodiment, the performance manager 121 may calculate the peak IOPS as in the example above, compare the peak IOPS to the minimum number of IOPS allowed by the selected PSL, and select the higher value of the two as the peak IOPS value. The performance manager may then calculate the expected IOPS as in the example above, compare the expected IOPS to the pre-determined expected IOPS of the PSL, and select the higher value of the two as the expected IOPS. In yet another embodiment, the performance manager 121 may perform pattern matching against the workload name and/or location in addition to PSL performance calculations similar to those described above. There may be PSLs that are mapped to keywords associated with the workload name and/or location. For example, volume names may provide an indication of the type of workload, such as Oracle, VM operations, etc. Location names may provide an indication of the location of the data center, the building ID, etc. In some examples, a PSL may be designed specifically to work the workloads having a particular name and/or location.

At block 410, the performance manager 121 compares the calculated performance of the PSL selected at block 406 to the estimated performance of the workload retrieved at block 402. In an embodiment, the performance manager 121 may compare the peak IOPS calculated at block 408 to the estimated maximum IOPS of the workload. The performance manager 121 may compare the calculated expected IOPS to the estimated 75$^{th}$ percentile IOPS. In some examples, the calculated peak IOPS may be compared against the estimated 95$^{th}$ percentile IOPS. In some embodiments, the calculated expected IOPS may be compared against the estimated average IOPS. In some examples, a different estimated percentile may be identified for comparison against the calculated peak IOPS and/or the calculated expected IOPS.

In another embodiment, the performance manager 121 may further calculate a difference between the peak IOPS, as determined above, and the previously estimated 75$^{th}$ percentile IOPS. The performance manager 121 may additionally calculate a difference between the expected IOPS, as determined above, and the previously estimated maximum IOPS. The performance manager 121 may then use the difference values in making a determination of which PSL to suggest, as discussed below.

In yet another embodiment, the performance manager 121 may compare the name and/or location of the workload to the keywords associate with the PSL. The performance manager 121 may consider the comparison a match if the name of workload matches a keyword associated with the PSL. The performance manager 121 may consider the comparison a match if the location of the workload matches a keyword associated with the PSL. In some embodiments, the performance manager 121 may consider the comparison a match if both the name and location match keywords associated with the PSL.

At decision block 412, the performance manager 121 determines whether the PSL is compatible with the workload. In some examples, the PSL may be considered compatible if the calculated peak IOPS is equal to or greater than the estimated peak IOPS as determined during the comparison above in block 410. In some embodiments, the PSL may be considered compatible if the calculated expected IOPS is equal to or greater than the estimated expected IOPS as determined in the comparison above in block 410. In some embodiments, the PSL may be considered compatible if both of the calculated peak IOPS and expected IOPS are equal to or greater than the estimated IOPS as determined in the comparison above in block 410. In some examples, the PSL may be considered compatible if the workload name matches a keyword associated with the PSL. In some embodiments, the PSL may be considered compatible if the workload location matches a keyword associated with the PSL. It is understood that any combination of the above, or other factors, may be considered when determining whether the PSL is compatible with the workload. In some examples, compatibility of the PSL with a workload may include latency.

If the performance manager 121 determines that the PSL is compatible with the workload, then the method 400 proceeds to block 414.

At block 414, the performance manager 121 performs additional checks of PSL (e.g., one or more). In some examples, the performance manager 121 may check the PSL against a list of secondary parameters to ensure that the PSL satisfies all conditions of the workload. In some embodiments, the performance manager 121 may ensure that the minimum IOPS defined for the PSL is compatible with the workload. In some examples, matching the name of the workload to keywords associated with the PSL may be a secondary parameter. In some examples, matching the location of the workload to keywords associated with the PSL may be a secondary parameter. In some examples, this comparison may be performed at block 410 and/or decision block 412. The method 400 proceeds from block 414 to block 416 as discussed below.

If, instead, at decision block 412 the performance manager 121 determines that the PSL is not compatible with the workload, the method 400 proceeds to block 416.

At block 416, the performance manager 121 checks whether there are any other PSLs to consider. If the performance manager 121 determines that there are one or more PSLs remaining to be considered, the method 400 returns to block 406 to select another PSL to consider and proceeds as discussed above and further below. If, instead, the performance manager 121 determines that there are no more PSLs to consider, the method 400 proceeds to block 418.

At block 418, the performance manager 121 identifies a PSL from a list of compatible PSLS to use with the workload. In some embodiments, the performance manager 121 selects the smallest PSL (e.g., lowest expected IOPS and/or peak IOPS) from the list that meets the workload IOPS and latency requirements. In some embodiments, no PSLs are considered compatible with the workload. In such embodiments, the performance manager 121 may identify the largest PSL (e.g., highest expected IOPS and/or peak IOPS) from the list.

In some embodiments, more than one PSL may qualify as the smallest PSL. The performance manager 121 may then consider whether the more than one PSL are equivalent. In some examples, two PSLs may be considered equivalent if they have the same expected latency, expected IOPS, and peak IOPS. When more than one PSL is equivalent, the performance manager 121 may select a PSL based on a predetermined order. In one example, the performance manager 121 may give priority to the currently assigned PSL, followed by the recommended PSL, and finally the performance manager 121 may pick a PSL randomly.

Figure 5:
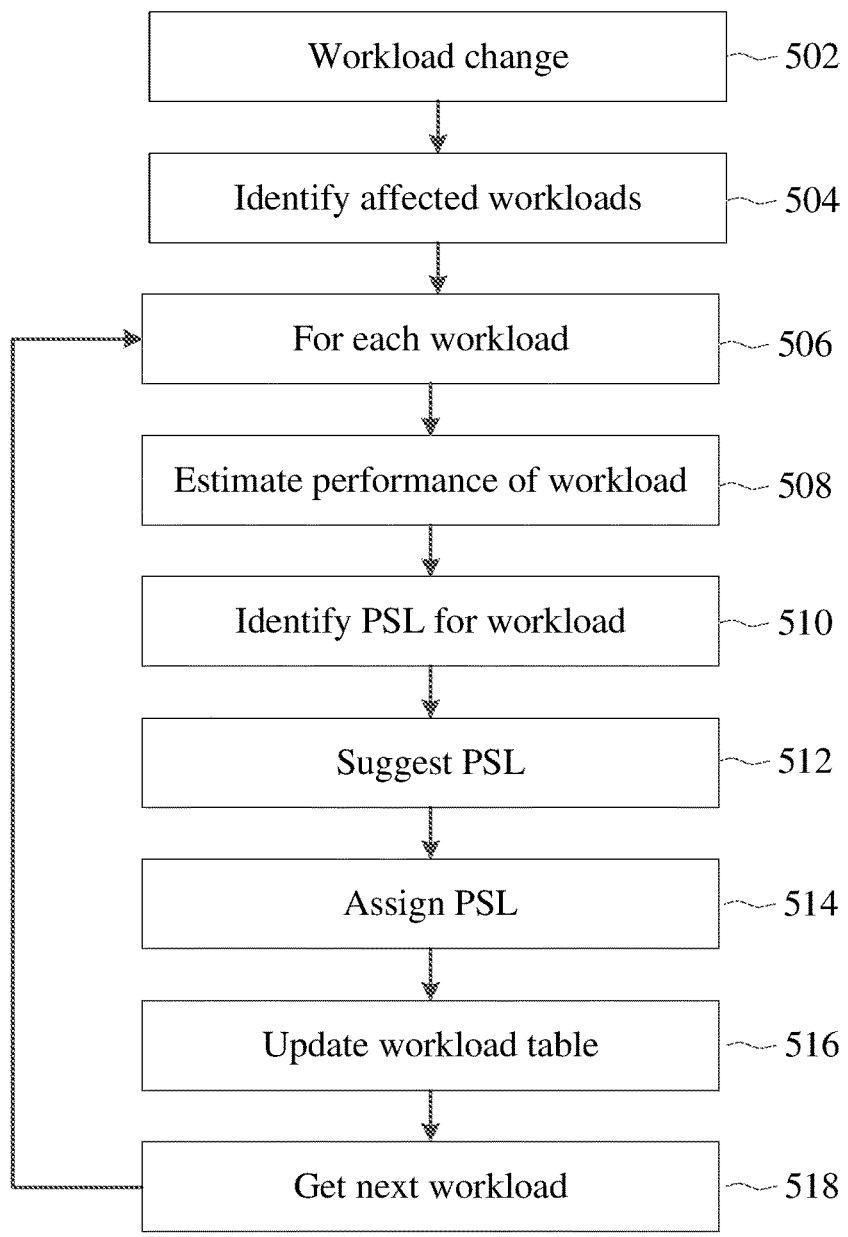
FIG. 5 illustrates a flow diagram of an exemplary method for selecting a compatible performance service level for a workload according to one or more embodiments.

Turning to FIG. 5, a flow diagram of an exemplary method 500 is illustrated according to one or more embodiments. In particular, the method 500 provides for assigning a PSL to a workload in response to a change in the workload status within a storage system such as architecture 100 or storage system 200. The work in method 500 may be performed by a management module that analyzes workloads (e.g., volumes or LUNs) in a storage system to estimate various usage values for IOPS, capacity, and latency. In some embodiments, the performance manager 121 may perform the management tasks. In some embodiments, the management module 218 may perform the management tasks. Although any suitable module may perform the analysis task, the performance manager 121 will be referred to below for simplicity. As illustrated, the method 500 includes a number of enumerated steps, but aspects of the method 500 may include additional steps before, after, and in between the enumerated steps. In some embodiments, one or more of the enumerated steps may be omitted, performed in parallel, or performed in a different order.

At block 502, the performance manager 121 detects a workload change. In some examples, the workload change may be a change in one or more workloads in the storage system. In some examples, the workload change may be the migration of a cluster of workloads from an unmanaged cluster to a managed cluster, such as for example, architecture 100 or storage system 200. Each workload that is migrated may have a PSL assigned to the workload. In some embodiments, the workload change may be the addition of one or more new workloads to an already managed cluster. In some embodiments, the workload change may be the upgrade of one or more workloads from an unmanaged version to a manage version. In some examples, a notification, or signal, may be sent to the performance manager 121 indicating the workload change. In some examples, the performance manager 121 may periodically check for a workload.

At block 504, the performance manager 121 identifies one or more workloads affected by the workload change detected at block 502. In some embodiments, the affected workload may be a volume. In some examples, the affected workload may be a logical unit number (LUN). In some embodiments, the affected workload may not have a PSL assigned.

At block 506, the performance manager 121 selects a workload from the one or more affected workloads identified at block 504. The performance manager 121 may iterate over each affected workload to assign a PSL to the workload.

At block 508, the performance manager 121 estimates the performance requirements for the workload selected at block 506. In some embodiments, the performance manager 121 may estimate the performance of the selected workload according to the method 300 discussed above with respect to FIG. 3. In some embodiments, the performance manager 121 may estimate the performance of the workload according to a different method.

At block 510, the performance manager 121 identifies a PSL for the selected workload. The performance manager 121 may use the estimated performance information from block 508 to identify a PSL for the selected workload. In some examples, the performance manager 121 may identify the PSL according to the method 400 discussed above with respect to FIG. 4. In some examples, a different method may be used to identify compatible PSLs. The method may take into account the IOPS, storage capacity, and latency of the workload. It may also take into account an overall budgeting framework, e.g. taking into account whether a candidate PSL for the selected workload would allow the system to adhere to the overall budgeting framework (e.g., an overall budget/overbudgeting of available IOPS). Similar to FIG. 4, the overall budgeting framework may instead (or additionally) be considered when assigning a PSL, such as at block 514 below. In some examples, the performance manager 121 may identify only one PSL. In some embodiments, the performance manager 121 may identify more than one PSL compatible with the workload.

At block 512, the performance manager 121 suggests one of the PSLs identified in block 510 for use with the workload. In some embodiments, only one PSL is identified and that PSL is suggested for use with the workload. In some embodiments, more than one PSL is identified and the performance manager 121 suggests the smallest PSL, in terms of the number of peak IOPS and expected IOPS. In some embodiments, one or more PSL may be considered equivalent. Multiple PSLs may be considered equivalent when they have the same expected latency, expected IOPS, and peak IOPS. When multiple PSLs are considered equivalent, the performance manager 121 may select a PSL according to a predetermined order. In one example, if one of the identified PSLs is already assigned, the performance manager 121 may suggest the already assigned PSL. Otherwise, the performance manager 121 may select a PSL from the one or more identified PSLs at random. In other embodiments, the performance manager 121 may prioritize a specified aspect of the PSL for determining which PSL to suggest, such as minimum IOPS, name, and/or location.

In some embodiments, no PSLs are identified as compatible with the workload. In such cases, the performance manager 121 may repeat block 510 and remove one of the evaluation criterion. For example, the performance manager 121 may repeat block 510 and not consider latency when identifying a compatible PSL. In some embodiments, a compatible PSL may still not be found. In cases where a compatible PSL cannot be found, the performance manager 121 may suggest the largest PSL, in terms of highest expected IOPS and peak IOPS. In some embodiments, the performance manager 121 may create a new PSL that is compatible with the workload.

At block 514, the performance manager 121 assigns the PSL suggested at block 512 to the selected workload. In some embodiments, the performance manager 121 may wait for user confirmation before assigning the PSL to the workload. In some embodiments, the performance manager 121 may be authorized to assign a PSL to a workload without user confirmation. In some embodiments, the performance manager 121 may be authorized to assign a PSL up to predetermined threshold without user confirmation and may require user confirmation for any PSL over the predetermined threshold. In such an example, the method 500 may proceed without waiting for the user confirmation and assign the PSL to the workload after receiving confirmation. The predetermined threshold may be based on the IOPS and/or latency of the PSL. The different PSLs may be associated with different price tiers for the user. In embodiments where the performance manager 121 is authorized to assign a PSL without user confirmation (e.g., automatically), the actions at blocks 512 and 514 may be combined, such that the result of the identification at block 510 may result in the assigning of that PSL automatically at block 514. In some embodiments, the assigned PSL may not be supported by the node (e.g., node 208.1) that hosts the workload. The performance manager 121 may then identify and move the workload to a node (e.g., node 208.2) that supports the assigned PSL.

At block 516, the performance manager 121 updates a workload table with the new workload and PSL assignment information. The workload table may include information about each workload and the PSL assigned to each workload. In some embodiments, the workload table may include additional settings related to the workloads. The workload table may be used to track a status of the workloads and PSLs, including for example keeping track of workload PSL analysis, PSL suggestion, and/or PSL assignment. As another example, the workload table may be used in determining In yet another embodiment, the performance manager 121 may use the workload table to perform pattern matching against the workload name and/or location in addition to PSL performance calculations similar to those described above as part of calculating PSL performance, determining compatibility, etc.

At block 516, the performance manager 121 checks if there any workloads left to be assigned a PSL and returns to block 506 to evaluate the next affected workload, if any. Otherwise, the method 500 is completed.

Figure 6:
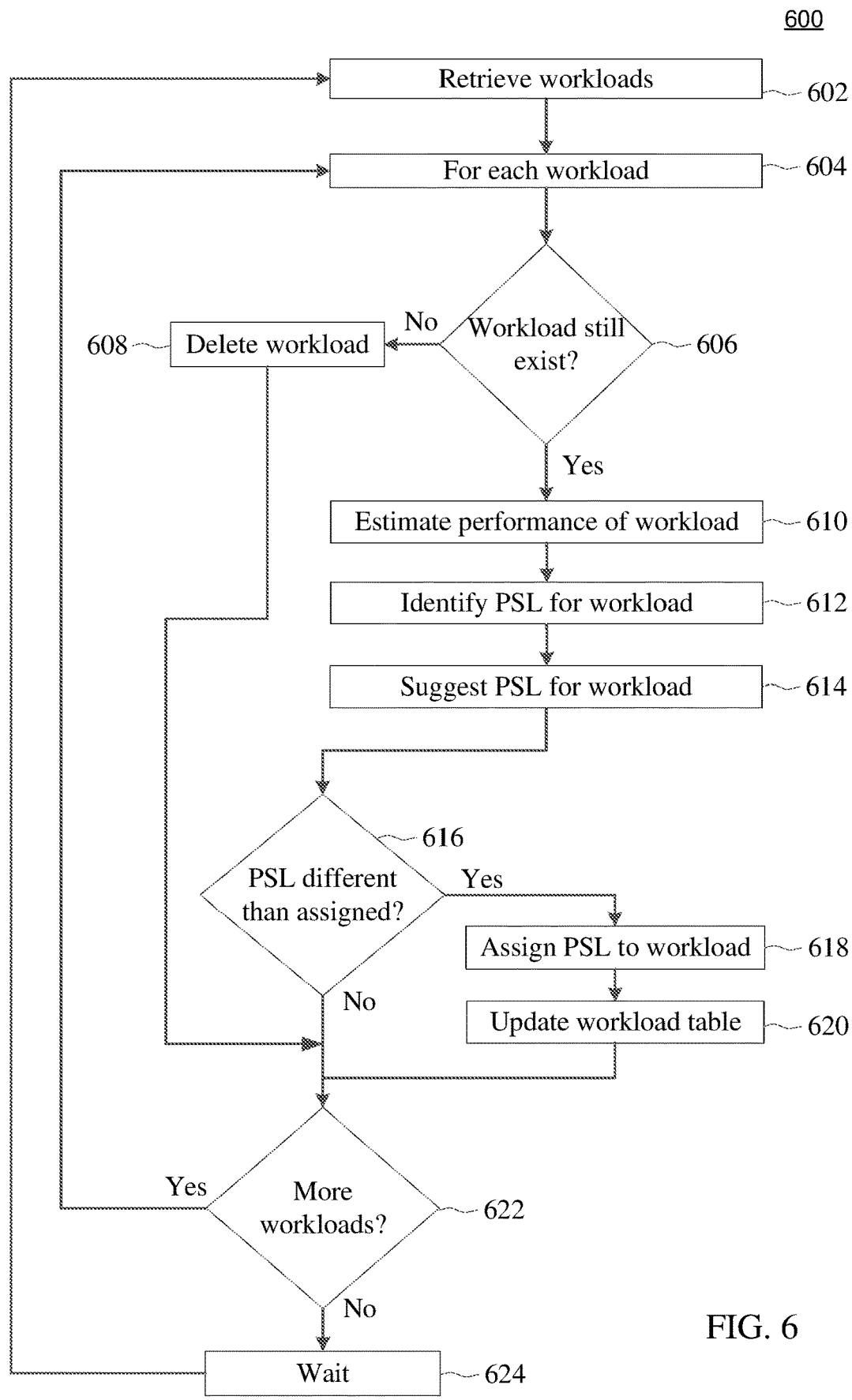
FIG. 6 illustrates a flow diagram of an exemplary method for periodically updating the performance service level of workloads according to one or more embodiments.

Turning to FIG. 6, a flow diagram of an exemplary method 600 is illustrated according to one or more embodiments. In particular, the method 600 provides for periodically updating the PSL assigned to each workload within a storage system such as architecture 100 or storage system 200. The work in method 600 may be performed by a management module that analyzes workloads (e.g., volumes or LUNs) in a storage system to estimate various usage values for IOPS, capacity, and latency. In some embodiments, the performance manager 121 may perform the management tasks. In some embodiments, the management module 218 may perform the management tasks. Although any suitable module may perform the analysis task, the performance manager 121 will be referred to below for simplicity. It is understood that additional steps can be provided before, during, and after the steps of method 600, and that some of the steps described can be replaced or eliminated for other embodiments of the method 600. As illustrated, the method 600 includes a number of enumerated steps, but aspects of the method 600 may include additional steps before, after, and in between the enumerated steps. In some embodiments, one or more of the enumerated steps may be omitted, performed in parallel, or performed in a different order.

At block 602, the performance manager 121 retrieves a list of workloads. In some embodiments, the storage system may store a list of workloads in a file or a database. In some embodiments, the performance manager 121 may retrieve the list of workloads from a workload table. The workload table may be stored in a database. The workload table may be stored in a file.

At block 604, the performance manager 121 selects a workload (e.g., an identifier and/or other information about the workload) from the list of workloads. The performance manager 121 may iterate over each workload in order to review the PSL assigned to each workload.

At decision block 606, the performance manager 121 determines whether the workload selected at block 604 still exists. If the performance manager 121 determines that the workload does not exist, then the method 600 proceeds to block 608.

At block 608, the performance manager 121 deletes the workload listing from the workload table. In some embodiments, the workload listing may be set as inactive in the workload table instead of deleting the workload listing. This may further result in an update to the overall budgeting framework for the system (e.g., indicating more IOPS available for budgeting/assigning for other workloads via PSL assignment(s), etc.). After deleting the workload listing from the workload table, the method 600 proceeds to block 622 to check whether there are more workloads listed to process.

If, instead, at decision block 606 the performance manager 121 determines that the workload still exists, the method 600 proceeds to block 610.

At block 610, the performance manager 121 estimates the performance demand of the workload selected at block 604. In some embodiments, the performance manager 121 may estimate the performance of the selected workload according to the method 300 discussed above with respect to FIG. 3. In some embodiments, the performance manager 121 may estimate the performance of the workload according to a different method.

At block 612, the performance manager 121 identifies a PSL that is compatible with the selected workload. The performance manager 121 may use the estimated performance information from block 610 to identify a PSL for the selected workload. In some embodiments, the performance manager 121 may identify the PSL according to the method 400 discussed above with respect to FIG. 4. In some embodiments, a different method may be used to identify one or more compatible PSLs. The method may take into account the IOPS, storage capacity, and latency of the workload. It may also take into account an overall budgeting framework, e.g. taking into account whether a candidate PSL for the selected workload would allow the system to adhere to the overall budgeting framework (e.g., an overall budget/overbudgeting of available IOPS). Similar to FIG. 4, the overall budgeting framework may instead (or additionally) be considered when assigning a PSL, such as at block 618 below. In some embodiments, the performance manager 121 may identify only one PSL. In some embodiments, the performance manager 121 may identify more than one PSL compatible with the workload.

At block 614, the performance manager 121 suggests a PSL to assign to the workload. This may be similar to block 512 of method 500 as discussed above with respect to FIG. 5. One or more PSLs may be identified as being compatible with the workload. The performance manager 121 may determine which PSL to suggest based on predetermined criteria. In some embodiments, the criteria may include the service tier to which the workload is subscribed. In some embodiments, the criteria may prioritize IOPS over latency. In some embodiments, the criteria may prioritize workload name and/or location over IOPS. In other embodiments where the identified PSL may be automatically assigned, the method 600 may proceed from block 612 to decision block 616 without providing a suggestion at block 614, or may still include the suggestion at block 614.

At decision block 616, the performance manager 121 determines whether the suggested PSL is different than the currently assigned PSL. In some embodiments, the performance manager 121 may decide to use the currently assigned PSL instead of the suggested PSL even if the suggested PSL is different. If the performance manager 121 decides to keep the assigned PSL, the method 600 proceeds to block 622. If, instead, the performance manager 121 decides to use the suggested PSL from block 614, the method 600 proceeds to block 618.

At block 618, the performance manager 121 assigns the suggested PSL to the workload. In some embodiments, the performance manager 121 may have permission to assign the PSL. In some embodiments, the performance manager 121 may have permission to assign certain PSLs according to a customer defined range. In some embodiments, the performance manager 121 may suggest the PSL and may not assign the PSL until approval is received. In these cases, the method 600 may proceed without waiting for approval. The performance manager 121 may assign the PSL to the workload after receiving approval. In some embodiments, the performance manager 121 may move the workload from the current node that does not support the newly assigned PSL to a node that does support the newly assigned PSL.

At block 620, the performance manager 121 updates the workload table with the updated workload and PSL information. In some embodiments, the performance manager 121 may update the workload table after assigning each PSL. In some embodiments, the performance manager 121 may perform a single batch update including all updated workload and PSL information after all of the workloads have been processed. In some embodiments, the workload table may be updated in parallel with the further processing of method 600.

At decision block 622, the performance manager 121 determines whether there are more workloads to analyze. If the performance manager 121 determines that there are more workloads to analyze, then the method 600 returns to block 604 to select another workload. If, instead, the performance manager 121 determines that there are no further workloads to analyze, the method 600 proceeds to block 624.

At block 624, the performance manager 121 waits a predetermined period of time before returning to block 602 to repeat method 600. In some embodiments, the performance manager 121 may wait 24 hours before returning to block 602. In some embodiments, the wait time may be shorter or longer depending on the needs of the system and available computing resources. In some embodiments, the performance manager 121 may wait until a specific time, such as for example 3:00 am, to return to block 602.

Figure 7:
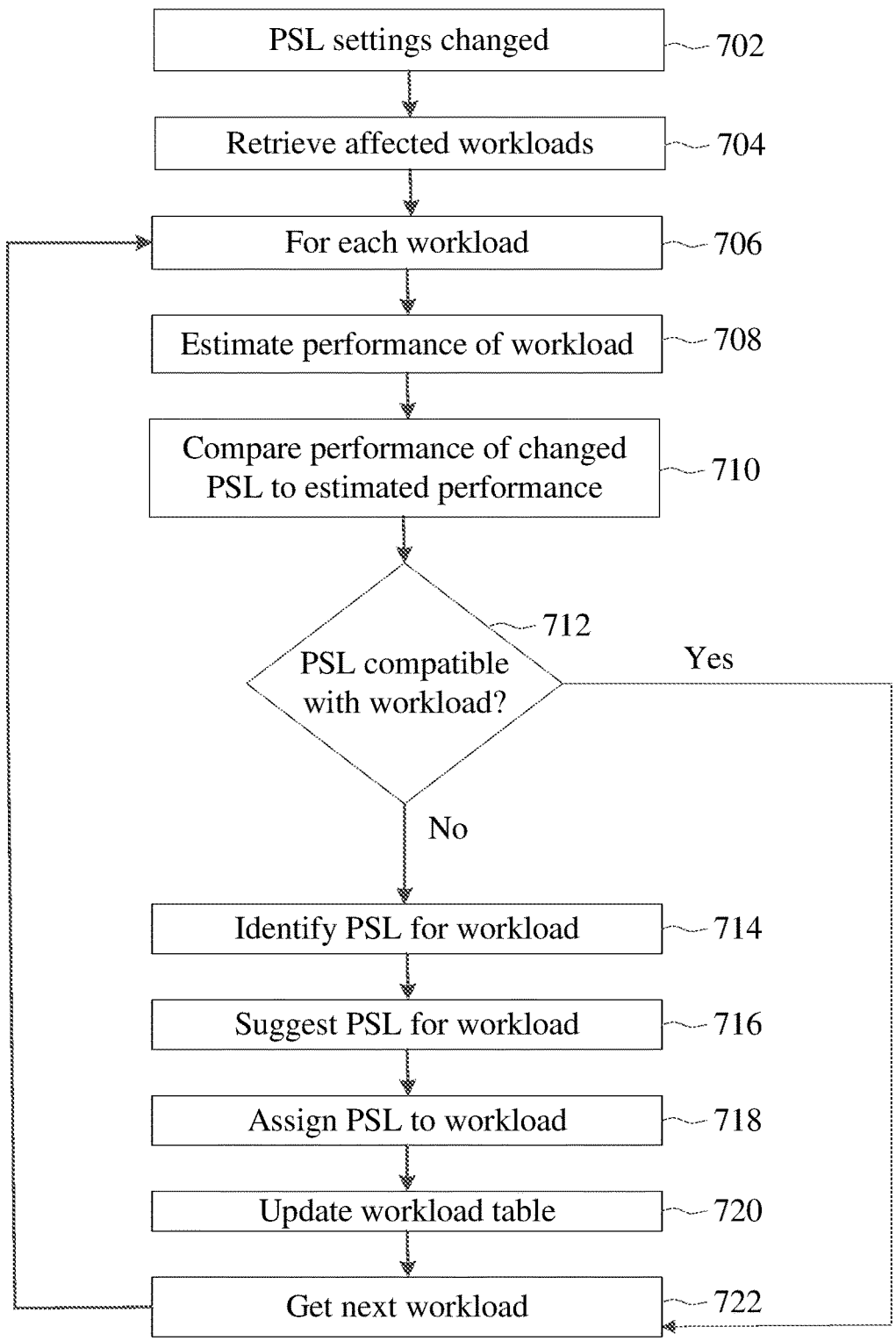
FIG. 7 illustrates a flow diagram of an exemplary method of handling changes to the settings of a performance service level according to one or more embodiments.

Turning to FIG. 7, a flow diagram of an exemplary method 700 is illustrated according to one or more embodiments. In particular, the method 700 provides for responding to a change in a PSL by determining the appropriate PSL for any affected workloads within a storage system such as architecture 100 or storage system 200. The work in method 700 may be performed by a management module that analyzes workloads (e.g., volumes or LUNs) in a storage system to estimate various usage values for IOPS, capacity, and latency. In some embodiments, the performance manager 121 may perform the management tasks. In some embodiments, the management module 218 may perform the management tasks. Although any suitable module may perform the analysis task, the performance manager 121 will be referred to below for simplicity. It is understood that additional steps can be provided before, during, and after the steps of method 700, and that some of the steps described can be replaced or eliminated for other embodiments of the method 700.

At block 702, the performance manager 121 identifies a PSL for which a setting has been changed. In some embodiments, the performance manager 121 may receive a notification, or signal, indicating that a PSL setting has changed. In some embodiments, the notification may include information about which PSL was changed. In some embodiments, the performance manager 121 may monitor the PSL settings for changes. In some embodiments, the PSL setting may be changed by the performance manager 121. In some embodiments, the PSL setting may be changed by a user, another process, or another task.

At block 704, the performance manager 121 retrieves a list of workloads that have been assigned the changed PSL identified at block 702. The performance manager 121 may retrieve the list of workloads from a workload table. In some embodiments, the workload table is stored in a database. In some embodiments, the workload table is stored in a file. In some embodiments, the list of workloads includes workloads assigned a different PSL than the PSL identified by block 702.

At block 706, the performance manager 121 selects a workload from the list of workloads. The performance manager 121 may iterate over each workload in order to ensure that the changed PSL is still compatible with each workload that is assigned the changed PSL.

At block 708, the performance manager 121 estimates the performance demand of the workload selected at block 706. In some embodiments, the performance manager 121 may estimate the performance of the selected workload according to the method 300 discussed above with respect to FIG. 3. In some embodiments, the performance manager 121 may estimate the performance of the workload according to a different method.

At block 710, the performance manager 121 compares the performance of the changed PSL from block 702 to the estimated performance demand from block 708. In some embodiments, the performance manager 121 may calculate the performance of the changed PSL similar to the calculations described above with respect to FIG. 4. That is, the performance manager 121 may calculate the PSL performance (e.g., peak IOPS, expected IOPS, latency) and compare it to the estimated performance of the workload. In some embodiments, the performance manager 121 may calculate a portion of the performance of the PSL based on the changes made to the settings of the PSL. For example, if only the peak IOPS settings of the PSL are changed, then the performance manager 121 may recalculate those values and not recalculate the expected IOPS and latency values. In some embodiments, the performance manager 121 may perform a different set of calculations to compare against the estimated performance of the workload.

At decision block 712, the performance manager 121 determines whether the changed PSL identified in block 702 is still compatible with the workload identified in block 706 based on the comparison performed at block 710. If the performance manager 121 determines that the PSL is not compatible with the workload, then the method 700 proceeds to block 714 to identify a compatible PSL for the selected workload.

At block 714, the performance manager 121 identifies a PSL that is compatible with the workload. The performance manager 121 may use the estimated performance information from block 708 to identify a PSL for the selected workload. In some embodiments, the performance manager 121 may identify the PSL according to the method 400 discussed above with respect to FIG. 4. In some embodiments, a different method may be used to identify one or more compatible PSLs. The method may take into account the IOPS, storage capacity, and latency of the workload. It may also take into account an overall budgeting framework, e.g. taking into account whether a candidate PSL for the selected workload would allow the system to adhere to the overall budgeting framework (e.g., an overall budget/over-budgeting of available IOPS). Similar to FIG. 4, the overall budgeting framework may instead (or additionally) be considered when assigning a PSL, such as at block 716 or 718 below. In some embodiments, the performance manager 121 may identify only one PSL. In some embodiments, the performance manager 121 may identify more than one PSL compatible with the workload.

At block 716, the performance manager 121 suggests one of the one or more PSLs identified in block 714. In some embodiments, the performance manager 121 may decide which PSL to suggest following similar methodology to that discussed above with respect to block 512 of method 500 in FIG. 5. In some embodiments, the performance manager 121 may suggest a PSL for the selected workload based on a set of predetermined criteria. In some embodiments, the performance manager 121 may suggest a PSL based on the service tier assigned to the workload. In some embodiments, the performance manager 121 may suggest a PSL based on the name and/or location of the workload. In other embodiments where the identified PSL may be automatically assigned, the method 700 may proceed from block 714 to block 718 without providing a suggestion at block 716, or may still include the suggestion at block 716.

At block 718, the performance manager 121 assigns the suggested PSL to the workload. In some embodiments, the performance manager 121 may have prior approval to assign the suggested PSL without user input. In some embodiments, prior approval may be limited to a subset of PSLs and the performance manager 121 may require approval to assign a PSL that is not included in the subset of PSLs. In some embodiments, the performance manager 121 may not assign the suggested PSL without approval from the customer. In such an example, performance manager 121 may continue with method 700 and assign the PSL once approval is received. In some embodiments, the performance manager 121 may move the workload from a current node that does not support the newly assigned PSL to a new node that supports the newly assigned PSL.

At block 720, the performance manager 121 updates the workload table to reflect the change in assigned PSL for the workload. In some embodiments, the performance manager 121 updates the workload table for each workload, if needed, as each workload is processed. In some embodiments, the performance manager 121 tracks the updates that need to be made and performs a single batch update to the workload table after processing all workloads.

If, instead, at decision block 712 the performance manager determines that the PSL is still compatible with the workload, then the method 700 proceeds to block 722.

At block 722, the performance manager 121 determines whether there are more workloads to be analyzed. If performance manager 121 determines that there are more workloads to be analyzed, then method 700 returns to block 706 to select another workload to be analyzed. If, instead, performance manager 121 determines that there are no more workloads to be analyzed, the method 700 finishes.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

The terms "component," "module," "system," and the like as used herein are intended to refer to a computer-related entity, either software-executing general-purpose processor, hardware, firmware and a combination thereof. For example, a component may be, but is not limited to being, a process running on a hardware processor, a hardware-based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
monitoring, by a performance manager executed by a processor, performance data of a workload from a plurality of workloads from one or more nodes in a cluster, the performance data comprising at least a number of input/output operations per second;
estimating, by the performance manager based on the performance data, a performance requirement for the workload within the cluster, wherein the performance requirement includes a maximum number of input/output operations per second (IOPS), an average number of IOPS, and a median number of IOPS;
determining, by the performance manager based on the estimated performance requirement for the workload, an estimated performance of one or more performance service levels (PSLs) for the workload from the plurality of workloads, wherein each of the one or more PSLs includes a service level agreement, a service level objective, and a latency;
determining, by the performance manager in response to the determining the estimated performance requirement for the workload, whether the one or more PSLs satisfy at least one secondary parameter, wherein the secondary parameter is different from the estimated performance of the one or more PSLs;
selecting, by the performance manager in response to a comparison of the estimated performance of the one or more PSLs to the performance data of the workload and satisfaction of the at least one secondary parameter indicating a compatible PSL, the PSL from the one or more PSLs having a smallest number of expected IOPS that meets a requirement of the workload to use for the workload within the cluster;
selecting, by the performance manager in response to the comparison and the determining the satisfaction of the at least one secondary parameter indicating no compatible PSL, the PSL from the one or more PSLs having a largest number of expected IOPS from among the one or more PSLs to use for the workload within the cluster;
assigning, by the performance manager, the selected PSL to the workload in the cluster; and
executing, by the one or more nodes, the workload using the assigned PSL.

2. The method of claim 1, wherein the service level agreement guarantees a first number of IOPS to a workload, the service level objective allows a second number of IOPS to the workload, and the second number of IOPS is higher than the first number of IOPS.

3. The method of claim 1, wherein a number of IOPS guaranteed by the assigned PSL is equal to a number of IOPS available in the cluster, or greater than the number of IOPS available in the cluster.

4. The method of claim 1, further comprising:
retrieving, by the performance manager on a periodic basis, updated performance data of the workload being executed by the assigned PSL;
repeating, by the performance manager in response to the periodic retrieving, the determining the estimated performance of each of the one or more PSLs, the determining the satisfaction of the at least one secondary parameter, and the selecting based on the comparison to determine an updated PSL;
comparing, by the performance manager, the updated PSL to the assigned PSL; and
assigning, by the performance manager, the updated PSL to the workload in response to the updated PSL being different than the assigned PSL.

5. The method of claim 1, wherein:
the estimated performance of the one or more PSLs comprises at least one of a calculated peak IOPS or a calculated expected IOPS,
the comparison comprises comparing, by the performance manager, at least one of the calculated peak IOPS or the calculated expected IOPS of each of the one or more PSLs to at least one of the maximum number of IOPS or average number of IOPS for the workload, and
compatibility is based on the at least one of the calculated peak IOPS or the calculated expected IOPS being greater than or equal to the at least one of the maximum number of IOPS or average number of IOPS for the workload.

6. The method of claim 1, wherein:
the comparison comprises comparing, by the performance manager, a name of the workload to respective keywords associated with the one or more PSLs, and
the compatibility is based on the name of the workload matching a keywork from among the respective keywords associated with the one or more PSLs.

7. The method of claim 1, wherein the selecting that is in response to the indicating the compatible PSL further comprises:
identifying, by the performance manager, a plurality of PSLs as compatible and having the same smallest number of expected IOPS; and
selecting, by the performance manager, the PSL from the plurality of PSLs based on a predetermined order.

8. The method of claim 1, wherein:
the monitoring of the performance data is continuous, and
the selecting the PSL is performed automatically without user confirmation.

9. A non-transitory machine-readable medium having stored thereon instructions for performing a method managing workload demand in a storage system, which when executed by at least one machine, cause the at least one machine to:
detect an addition of a workload to the storage system from a plurality of workloads from one or more clients;
monitor performance data of the workload from the plurality of workloads, the performance data comprising at least a number of input/output operations per second (IOPS);
estimate a performance demand of the workload, the performance demand comprising at least one IOPS metric;
determine, based on the estimated performance demand for the workload, an estimated performance of one or more performance service levels (PSLs) for the workload, wherein each of the one or more PSLs includes a service level agreement;
compare the estimated performance of the one or more PSLs to performance data of the workload to determine compatibility of the one or more PSLs to the estimated performance demand for the workload;
determine, in response to the comparison identifying compatibility, whether the one or more PSLs satisfy at least one secondary parameter, the at least one secondary parameter being different than the estimated performance of the one or more PSLs;
select, in response to the comparison identifying compatibility and satisfaction of the at least one secondary parameter, a PSL from the one or more PSLs having a smallest number of expected IOPS that meets a requirement of the workload to use for the workload;
select, in response to the comparison identifying no compatibility and no satisfaction of the at least one secondary parameter, the PSL from the one or more PSLs having a largest number of expected IOPS from among the one or more PSLs to use for the workload;
assign the selected PSL to the workload; and
execute the workload by the at least one machine using the assigned PSL.

10. The non-transitory machine-readable medium of claim 9, wherein the instructions when executed further cause the at least one machine to:
update a workload table with the assigned PSL, the workload table maintaining mappings between a plurality of workloads in the storage system, including the detected workload, and one or more PSLs including the assigned PSL,
wherein the workload table is analyzed to identify the assigned PSL.

11. The non-transitory machine-readable medium of claim 9, wherein the assigned PSL further includes a service level objective and an allowed latency.

12. The non-transitory machine-readable medium of claim 9, wherein the at least one IOPS metric comprises a maximum number of input/output operations per second (IOPS), an average number of IOPS, and a median number of IOPS.

13. The non-transitory machine-readable medium of claim 9, wherein the instructions when executed further cause the at least one machine to:
identify, periodically, a new PSL and assign the new PSL to the workload.

14. The non-transitory machine-readable medium of claim 9, wherein the instructions when executed further cause the at least one machine to:
determine, in response to detection of a change in the PSL, that the changed PSL is still compatible with the estimated performance demand.

15. The non-transitory machine-readable medium of claim 9, wherein the instructions when executed further cause the at least one machine to:
retrieve historical performance data of the workload to use to estimate the performance demand.

16. A computing device comprising:

a memory having stored thereon instructions for performing a method of managing a workload in a storage system; and a processor coupled to the memory, the processor configured to execute the instructions to:

monitor performance data of the workload, the performance data comprising at least a number of input/output operations per second (IOPS);

detect that at least one parameter of an existing performance service level (PSL) assigned to the workload has changed;

estimate a performance demand of the workload based on the performance data associated with the workload, on a per workload basis, the estimated performance demand comprising at least one IOPS metric;

determine, based on the estimated performance demand, an estimated performance of each of a plurality of PSLs, including the existing PSL, for the workload, wherein the determination is based on the at least one parameter that has changed from among a plurality of parameters of the plurality of PSL;

compare the estimated performance of each of the plurality of PSLs to the performance data of the workload to determine compatibility of each of the plurality of PSLs to the estimated performance demand for the workload;

select, in response to the comparison identifying compatibility, an updated PSL from the one or more PSLs having a smallest number of expected IOPS that meets a requirement of the workload;

select, in response to the comparison identifying no compatibility, the updated PSL from the one or more PSLs having a largest number of expected IOPS from among the one or more PSLs;

compare the updated PSL to the existing PSL;

assign the updated PSL to the workload in response to the updated PSL being different from the existing PSL; and continue to execute the workload using the updated PSL.

17. The computing device of claim 16, wherein the processor is further configured to execute the instructions to: select the updated PSL based upon a service tier assigned to the workload.

18. The computing device of claim 16, wherein:

the estimated performance of the one or more PSLs comprises at least one of a calculated peak IOPS or a calculated expected IOPS, the processor is further configured to execute the instructions, for the comparison, to compare at least one of the calculated peak IOPS or the calculated expected IOPS of each of the one or more PSLs to at least one of the maximum number of IOPS or average number of IOPS for the workload, and compatibility is based on the at least one of the calculated peak IOPS or the calculated expected IOPS being greater than or equal to the at least one of the maximum number of IOPS or average number of IOPS for the workload.

19. The computing device of claim 16, wherein:

the processor is further configured to execute the instructions, as part of the comparison, to compare, by the performance manager, a name of the workload to respective keywords associated with the one or more PSLs, and the compatibility is based on the name of the workload matching a keywork from among the respective keywords associated with the one or more PSLs.

20. The computing device of claim 16, wherein the processor is further configured to execute the instructions to:

compare, prior to the assignment, the updated PSL to one or more secondary parameters of the workload to determine whether the updated PSL satisfies all of the one or more secondary parameters for the workload.

21. The computing device of claim 16, wherein the processor is further configured to execute the instructions, as part of the selection in response to the comparison identifying the compatibility, to:

identify a subset of PSLs as compatible and having the same smallest number of expected IOPS; and select the updated PSL from the subset of PSLs based on a predetermined order.

* * * * *